Patented June 25, 1929.

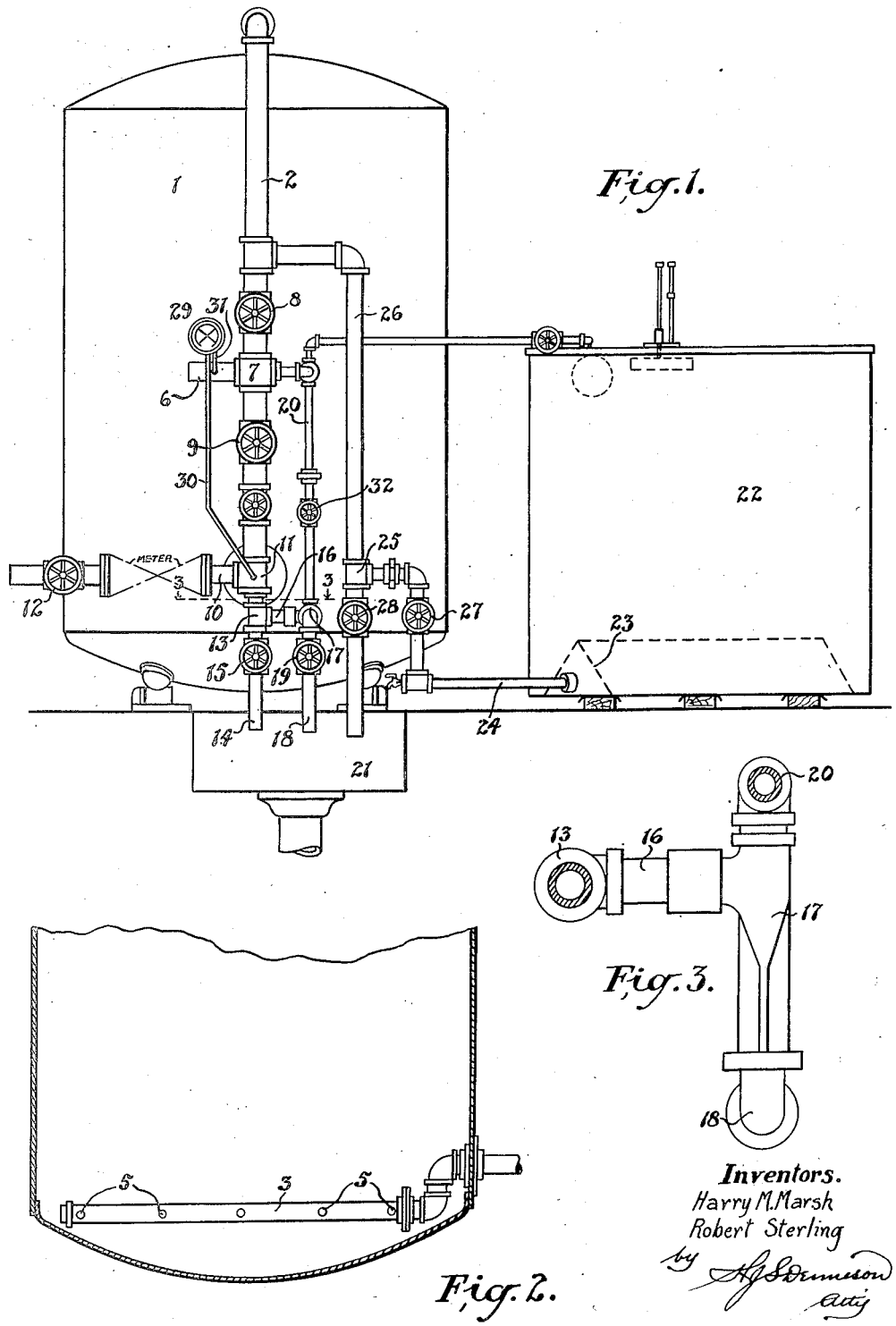

1,718,244

UNITED STATES PATENT OFFICE.

HARRY MARKHAM MARSH AND ROBERT STIRLING, OF HAMILTON, ONTARIO, CANADA, ASSIGNORS TO W. J. WESTAWAY COMPANY LIMITED, OF HAMILTON, ONTARIO, CANADA.

WATER-SOFTENING FILTER.

Application filed July 19, 1926. Serial No. 123,447.

The principal objects of the invention are to enhance the efficiency of water softening filters in which zeolite is used, and to provide an apparatus which will enable the rapid and effective regeneration of the zeolite being effected in a very simple manner.

The principal feature of the invention consists in the novel construction and arrangement of apparatus, whereby the sediment accumulated in the filter may be very readily and completely removed and a regenerating concentrated solution of brine may be introduced to thoroughly permeate the mass of zeolite.

In the accompanying drawings, Figure 1 is an elevational view of our improved apparatus.

Figure 2 is a vertical sectional view of the lower part of the softener tank.

Figure 3 is an enlarged plan section of the piping arrangement of the injector on the line 3—3 of Figure 1.

The use of zeolite as a water softener is very well known and it has been the practice to regenerate the water softening qualities of the zeolite by the introduction of salt or sodium chloride thereinto. One of the more advanced methods of introducing the salt has been to form a brine and direct it into the softening tank containing the zeolite by means of an injector operated by water pressure.

The ordinary method of introducing the brine into the top of the softener tank by means of an ejector has the objection that the brine is diluted by the water flowing through the ejector and also by the volume of water contained in the tank and it is the purpose of this invention to overcome this principal objection, as well as to render the other features of manipulating the apparatus more simple than has hitherto been accomplished.

In the construction of apparatus herein shown the softener tank 1 which is of an ordinary cylindrical form is filled to a suitable level with zeolite.

A stand pipe 2 arranged vertically outside of the tank 1 is connected at the upper end to the top of the tank and at the lower end to a horizontal pipe 3 arranged within the tank. The pipe 3 is provided with a plurality of perforations 5.

The hard water supply pipe 6 is connected to a cross fitting 7 in the stand pipe and valves 8 and 9 are arranged above and below the cross to regulate the direction of flow of the hard water to the top or bottom of the tank as may be desired.

The soft water outlet 10 is connected to the fitting 11 connecting the stand pipe 2 to the pipe leading into the bottom of the tank and a valve 12 is arranged therein.

A T 13 is connected to the bottom of the fitting 11 and leads to the softener drain pipe 14 which is controlled by a valve 15. The horizontal branch of the T 13 is connected to the suction branch 16 of an ejector 17 which leads to the drain 18 controlled by a valve 19.

The ejector is operated by a jet of water fed thereto by a pipe 20 connected to the hard water supply at the fitting 7. When the ejector is operated it draws the water from the bottom of the softener tank discharging it through the drain pipe 18 to a sump 21 arranged beneath the tank.

A brine tank 22 is arranged beside the tank 1 and is provided with a suction box 23 in the bottom with which a pipe 24 is connected. This brine pipe is connected by the T 25 to a back wash drain pipe 26 which is connected to the stand pipe 2 above the valve 8.

The brine pipe is provided with a valve 27 and a valve 28 is arranged in the back wash drain 26 below the connection to the brine pipe.

A double gauge 29 is connected by the pipe 30 to the fitting 11 through which the soft water flows and by the pipe 31 to the hard-water inlet 6.

In the use of this apparatus the valves 9, 15, 19, 28 and 27 are closed and the valve 8 is open allowing the hard water to flow to the top of the softener tank. The water in passage through the bed of zeolite in the tank is filtered and softened and it flows out through the perforated pipe 3 through the fitting 11 to the soft water outlet 10.

When the softening quality of the zeolite becomes depleted the valve 8 is closed as also is the valve 12 and the valve 9 in the stand pipe is opened allowing the hard water to flow downwardly in the stand pipe to the pipe 3 in the tank. The valve 28 in the back wash drain is opened and the water flows upwardly through the filter bed clearing the upper strata thereof of sediment.

When the filter has been cleaned the valves 9 and 28 are closed, thus shutting off any further supply of water to the tank 1 and closing the back wash drain. The valve 27 is then opened connecting the pipe 26 with the brine pipe 24. The valve 19 in the ejector drain is opened as also is the valve 32 in the water pipe 20 leading to the ejector and a suction is created to draw the water from the bottom of the tank 1 through the pipe 3, fitting 13 and pipe 16, discharging it into the sump 21. The evacuation of the water from the tank 1 creates a suction in the pipes 26 and 24 and draws the concentrated solution of brine from the brine tank. It will thus be seen that the brine enters the softener tank without dilution either from the ejector or from water in the tank as the brine follows the ejection of the water from the tank. The concentrated brine is thus drawn through the mass of zeolite in the tank and the maximum regeneration effect is produced.

When the brine has completely permeated the mass of zeolite the ejector is shut off as also is the brine valve 27 and after the brine has remained in the tank the required period the valve 8 is opened allowing the hard water under pressure to again flow to the top of the tank. The valve 15 is opened to allow the draining of the salt water from the softener and as soon as the salt is cleared from the filter the valve 15 is closed and the valve 12 is opened to continue the flow of soft water through the outlet 10.

What we claim as our invention is:

1. A water softening apparatus, comprising a softening filter, a stand pipe connected with the top and bottom of said filter, a hard water supply connected to said stand pipe intermediate of its length, valves arranged in said stand pipe each side of said hard water supply, a back wash drain connected between one of said valves and the connection of the stand pipe to the filter, a drain connected to said stand pipe beyond the other valve therein, an ejector connected with the latter drain, a brine supply connected with the back wash drain, means for closing the back wash drain, means for shutting off the brine supply, means for closing the other drain, and means for directing the softened water from the filter.

2. A water softening apparatus, comprising a softening filter, a stand pipe connected with the top and bottom of said filter, a hard water supply connected to said stand pipe intermediate of its length, valves arranged in said stand pipe each side of said hard water supply, a soft water outlet connected with the lower end of the stand pipe, means for closing said outlet, a drain connected with the bottom of the stand pipe, an ejector connected with said drain, means for closing said drain, a back wash drain connected to said stand pipe above the upper valve therein, means for closing said back wash drain, a brine supply connected with the back wash drain, and means for shutting off said brine supply.

HARRY MARKHAM MARSH.
ROBERT STIRLING.